United States Patent [19]

Ahmed

[11] Patent Number: 4,990,279
[45] Date of Patent: Feb. 5, 1991

[54] ELECTRORHEOLOGICAL FLUIDS

[75] Inventor: Syed M. Ahmed, Wilmington, Del.

[73] Assignee: Hercules Incorporated, Wilmington, Del.

[21] Appl. No.: 341,450

[22] Filed: Apr. 21, 1989

[51] Int. Cl.$^5$ .................. C10M 169/04; C09K 3/00
[52] U.S. Cl. ........................ 252/73; 252/78.1;
        252/79; 252/572; 524/504; 524/533; 524/853;
        525/285; 525/291; 525/301; 525/308; 525/317
[58] Field of Search ............ 252/73, 77, 75, 76,
        252/78.1, 79, 572; 524/533, 504, 853; 525/301,
        285, 291, 308, 317

[56] References Cited

U.S. PATENT DOCUMENTS

| | | | |
|---|---|---|---|
| 3,399,164 | 8/1968 | Osmond | 524/533 |
| 3,950,284 | 4/1976 | Eukuda et al. | 524/461 |
| 4,033,892 | 7/1977 | Stangroom | 252/76 |
| 4,129,513 | 12/1978 | Stangroom | 252/78.1 |
| 4,315,085 | 2/1982 | Ozari et al. | 525/301 |
| 4,336,177 | 6/1982 | Backhouse et al. | 524/533 |
| 4,420,596 | 12/1983 | Lochhead et al. | 526/212 |
| 4,427,820 | 1/1984 | Backhouse et al. | 524/504 |
| 4,469,825 | 9/1984 | Kowalski et al. | 525/902 |
| 4,502,973 | 3/1985 | Stangroom | 252/73 |
| 4,533,695 | 8/1985 | Theodore et al. | 524/504 |
| 4,710,525 | 12/1987 | Kraemer et al. | 525/902 |
| 4,734,445 | 3/1988 | Noda et al. | 525/902 |
| 4,772,407 | 9/1988 | Carlson | 252/74 |
| 4,785,030 | 11/1988 | Noda et al. | 525/902 |
| 4,873,166 | 10/1989 | Senga et al. | 524/533 |

FOREIGN PATENT DOCUMENTS

| | | | |
|---|---|---|---|
| 2557574 | 7/1985 | France | 524/533 |
| 1570234 | 7/1975 | United Kingdom | 33/2 |
| 2207680 | 2/1989 | United Kingdom | 525/902 |

Primary Examiner—Paul Lieberman
Assistant Examiner—Christine A. Skane
Attorney, Agent, or Firm—Mark Goldberg; Joanne W. Patterson

[57] ABSTRACT

Disclosed are electrorheological (ER) fluids which display improved stability against sedimentation, reduced current density and good electrorheological response. These ER fluids are prepared from monomers which are polymerized by dispersion polymerization in a low conductivity medium which in most embodiments of the invention serves as the dispersion medium for the fluid. the ER fluids are further processed by modifying the polymer particles through polymerization of a hydrophilic monomer to form a hydrophilic shell or globule around the particles. The resulting dispersion is then doped with water to obtain a stable ER fluid. The hydrophilic shell or globule constitutes a minor part of the particle. Water dopant is only absorbed by the hydrophilic portion of the particle and does not enter into the core of the particle. The quantity of water is significantly reduced, which in turn results in a significant reduction of the current density at any given applied field strength.

23 Claims, No Drawings

ELECTRORHEOLOGICAL FLUIDS

This invention relates to novel electrorheological fluids which display improved stability against sedimentation, reduced current densities, a low requirement for dopant and good electrorheological response.

This invention is particularly concerned with the polymerization of chosen monomers in a low conductivity medium which, in addition to serving as polymerization medium, in most embodiments of the invention, also serves as the dispersion medium for the electrorheological fluid. In other embodiments the monomer may first be dispersion polymerized to the desired particle size, recovered from the polymerization medium, and then dispersed in the dispersion medium. In the instant invention the surface of the hydrophobic polymer particles is hydrophilically modified followed by addition of dopant. In prior art fluids the monomers are first polymerized, then ground to the desired size and doped, and finally dispersed in a liquid medium. This invention eliminates the grinding step and offers better control over polymer particle size and particle size distributions in a low conductivity medium.

Electrorheological (ER) fluids have been known for some time to be colloidal dispersions of polymeric particles in a low conductivity continuous medium which show dramatic changes in flow properties when exposed to an electric field. These fluids have been known by a number of other names including electrofluids, electroviscous fluids, electroresponsive fluids, electrorestrictive fluids and jammy fluids. Fluids exhibiting these properties were first referred to as "electroviscous" because of their apparent viscosity changes in the presence of electric fields. Such compositions are now more commonly referred to as "electrorheological" fluids, since such properties are better understood in terms of the total rheology of the fluids.

These fluids respond to the influence of an electric potential by showing a very rapid and pronounced increase in bulk viscosity. This phenomenon can appear as an increase in apparent viscosity of several or more orders of magnitude. The phenomenon is generally completely reversible, with the compositions reverting to their initial (zero-field) viscosity upon removal of the electric field. ER fluids change their characteristics very rapidly when electric fields are applied or released with typical response times being on the order of milliseconds. The ability of ER fluids to respond rapidly to electrical signals allows devices using ER fluids to replace standard electromechanical elements. This greatly expands the number of repetitions a mechanical device can perform. Therefore, ER fluids offer important advantages in a variety of mechanical systems, particularly those which require a rapid response interface between electronic controls and mechanical devices.

One common application of such fluids is in electromechanical clutches in which the fluid is disposed between the surfaces of two electrically conductive members and an electric potential is applied across the two members. The fluid responds to the application of the electric potential by instantaneously, but reversibly, changing in apparent bulk viscosity and yield stress. In strong fields, the fluid thickens to a solid or semi-solid condition whereby torque can be transmitted between the surfaces of the clutch members. This phenomenon can be used in a number of other applications such as fluid filled engine mounts, high speed valves with no moving parts and the interface between electronic and mechanical parts of a machine.

Typically, an ER fluid consists of four components: vehicle, particulate, polar liquid, and stabilizer(s). The particulate material and polar liquid constitute the dispersed phase of the system, with the vehicle being the continuous phase. Each of the four components mentioned above can be one material or a mixture of more than one material.

The continuous phase or vehicle is usually a nonpolar, insulating liquid with a low dielectric constant. As used herein the term "dielectric" refers to substances having very low electrical conductivities. Mineral oil, silicone oil and various aliphatic hydrocarbons are good examples of such liquids. The viscosity and the density of the vehicle play an important role in the performance of ER fluids. Stability and zero-field viscosity of ER fluids are highly dependent on these factors.

A variety of materials including starch, silica-gel, and hydrophilic synthetic polymers have been found to be useful as fine dispersed particles, which typically contain adsorbed water and surfactant, suspended in a nonpolar dielectric fluid having a permittivity less than that of the particle and a high breakdown strength. Conductivity, permittivity, particle size, and hydrophilicity of the particulate material are variables that may affect the performance of an ER fluid.

The polar liquid component is usually water, however, it may be an alcohol or another liquid. The polar liquid has been described as functioning to make the surface of the particles overly wet and sticky, under the applied electric force to facilitate bridging. It has also been described as facilitating polarization of the particles under the applied potential to create strong attractive forces between the particles.

Suspension stabilizers such as surface active agents or surfactants are often used to prevent the particles from coagulating and settling, or to increase the electrorheological response of the fluid, or both. Some researchers reported that stabilizing materials adversely affected ER response, however.

Prior to the instant invention, ER fluids have been made from bulk polymers which were initially pulverized into particles, followed by addition of a polar liquid. These particles were then dispersed in the desired continuous phase liquid which contained stabilizers or surfactants, if desired. This process of making ER fluids is cumbersome and has some inherent disadvantages including difficulty in obtaining particles of the desired size to prepare stable dispersions. Particle sedimentation is a major difficulty which has only been partially resolved in the prior art by matching the density of the particles with the density of the dispersion medium. However, the particles do not generally remain dispersed over a wide range in temperature. Usually, the density of the medium is more sensitive to changes in temperature than is the density of the dispersed polymer, and consequently, phase separation occurs with a change in temperature.

The density matching approach is shown in several patents issued to Stangroom, including U.S. Pat. Nos. 4,033,892; 4,129,513 and 4,502,973 and British Patent No. 1,570,234, dated June 25, 1980. The basic characteristics of the polymers as particulate materials for ER fluids defined in the Stangroom patents include the following: Particles that are hydrophilic, sufficiently porous to be capable of adsorbing a certain amount of water, and contain ionizable groups enabling the water to acquire an electric charge. In Stangroom's most recent patent cited herein, the polymer was defined by its water absorbency and its density. Stangroom found it to be advantageous to avoid use of particles of polymer which were less than 1 micron in size as it was believed that the smaller size would lead to undesirable zero-field properties in a fluid. Since his approach for making stable ER fluids was to match the density of the dispersed phase with that of the continuous phase, the main criterion used in selection of a continuous phase was density. For this reason, not only single component continuous phases, but also blends of selected liquids were used. It was emphasized that the density matching should be done at the use temperature to avoid instability of the fluids.

This invention addresses many of the disadvantages found in the prior art ER fluids. The size reduction step is not necessary and there is no longer a problem with particle sedimentation. It is not necessary to match the density of the polymer to that of the dispersion media to obtain electrorheological fluids of excellent stability. The prior art polymeric particles reported to give good ER response are generally hydrophilic polymers. This invention introduces a new concept of hydrophobic-hydrophilic polymeric particles. The bulk of the particle consists of hydrophobic polymer with a relatively minor amount of hydrophilic polymer forming a shell or globule covering the hydrophobic polymer core of the particle. The amount of water required as a dopant for prior art hydrophilic polymer particles is much greater than that required by the hydrophobic-hydrophilic polymers of this invention. The higher the amount of water in an ER fluid, the higher are the current densities.

Consequently, this invention provides a method of producing a stable electrorheological fluid that requires a minimum quantity of water as dopant, thus significantly reducing the current densities. In the prior art, polymers used as particles in an ER fluid system are generally made by a polymerization process and recovered as bulk polymer rather than in the fine particle form. The dispersion polymerization process, which results in a polymeric dispersion of finely divided spherical particles, has not been used for making ER fluids mainly because the hydrophilic monomers are not usually soluble or dispersible in the desired continuous medium. A solution for these problems is provided by this invention.

SUMMARY OF THE INVENTION

Electrorheological fluids of novel composition have been prepared having improved stability against sedimentation, reduced current density, and good electrorheological response. These fluids consist of dispersions of polymeric particles in dielectric media. The particles are first formed by polymerization in the desired medium with a polymer present to act as a steric stabilizer. The resulting polymeric particles are usually less than 1 micron in diameter, however, particles ranging from about 0.1 micron to 10–25 microns in diameter can be made using this process. Typical particle diameters are in the range of 0.5 to 0.8 micron. ER fluids prepared in this manner eliminate the problems associated with particle recovery, drying and subsequent grinding of prior art procedures. The polymeric particles of these ER fluids are then hydrophilically modified by polymerization of a hydrophilic monomer, such as acrylic acid, to form a hydrophilic shell or globule at the particle-medium interface. The hydrophilic shell or globule constitutes about 15% of the particle. Water dopant is only adsorbed by the hydrophilic portion of the particle and does not enter into the core of the particle. The quantity of water required is significantly reduced, which in turn results in a significant reduction of the current density at a given applied electrical field. Optimal properties are obtained by adjusting the level of polymer in the vehicle and by substituting a lower viscosity continuous phase fluid for the higher viscosity medium used during polymerization.

DETAILED DESCRIPTION OF THE INVENTION

The polymerizations of the monomers of this invention are of the type known as dispersion polymerizations wherein the monomer(s) are completely soluble in the polymerization medium but the resulting polymers are not. The initial reaction mixture is, therefore, homogeneous. The essential components in this process include the monomer, the initiator, the continuous phase medium and a stabilizer. Crosslinking agents will usually be present since a crosslinked core polymer particle requires less hydrophilic material to be added to the core polymer particle.

Among the monomers which may be polymerized to form the hydrophobic core of the particles dispersed in the medium are acrylates such as ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl acrylate, nonyl acrylate, hexyl acrylate, and n-hexyl methacrylate. Representative higher alkyl acrylic esters are decyl acrylate, isodecyl methacrylate, lauryl acrylate, stearyl acrylate, behenyl acrylate and mryistyl acrylate and the corresponding methacrylates. Mixtures of two or three or more long chain acrylic esters may be successfully polymerized with one of the carboxylic monomers. One typical useful class of copolymers is the methacrylates where the alkyl group contains 10 to 18 carbon atoms. Other monomers which can be used include styrenes (including alpha-methyl styrene), vinyl acetate, vinyl chlorides, vinyl toluene and acrylonitriles.

The polymers also may be cross-linked with a polyfunctional vinylidene monomer containing at least two terminal $CH_2$ groups, including for example, butadiene, isoprene, divinyl benzene, divinyl naphthalene, acrylates and the like. When the optional cross-linking agent is present, the polymeric mixtures usually contain up to about 5 or more percent by weight of cross-linking monomer based on the total monomer present, and more preferably, about 0.1 to 2.0 weight percent.

The hydrophilic monomers which are polymerized to form a hydrophilic shell or globule around the hydrophobic polymer particles are selected from the carboxyl-containing, the sulfate or sulfonate-containing, the hydroxy-containing, the amide-containing, the quaternary-containing, the amine-containing or the polyoxyethylene-containing monomers. The carboxyl-containing monomers include acrylic acid, methacrylic acid, itaconic acid, aconitic acid, fumaric acid, and maleic acid. The sulfonate-containing monomers include 2-sulfoethyl acrylate, 2-sulfoethyl methacrylate, p-vinylbenzene sulfonate, vinylbenzyl sulfonate and vinyl sulfonate. The hydroxy-containing monomers include 2- hydroxyethyl acrylate and 2-hydroxyethyl methacrylate. The amide-containing monomers include acrylamide, methacrylamide and N-methylolacrylamide. The quaternary-containing monomer is vinylbenzyltrimethylammonium chloride. The amine-containing monomers include 2-aminoethyl methacrylate and 2-dimethylaminoethyl methacrylate. The polyoxyethylene-containing monomers are acrylate ester-polyoxyethylene adducts.

The organic liquid used both for polymerization and as the vehicle for the ER fluid in most of the examples herein is mineral oil, a colorless, petroleum liquid product, normally containing a major proportion of liquid aliphatic hydrocarbon materials. The continuous liquid phase can be selected from any one of a large number of electrically insulating hydrophobic liquids in which the monomer selected dissolves. These include transformer oils, transformer insulating fluids, silicone oils, mineral oils, aliphatic hydrocarbons such as paraffin oils, halogenated aromatic liquids and halogenated paraffins and mixtures thereof. As known to those familiar with such compounds, transformer oils refer to those liquids having characteristic properties of both electrical and thermal insulation. Naturally occurring transformer oils include refined mineral oils which have low viscosity and high chemical stability.

The specific gravity of the mineral oil, used in the examples herein, normally ranges from about 0.76 to about 0.79, with a boiling range from about 150° C. to about 200° C. While the flash point is normally above about 40° C., for safety reasons the flash point should preferably be above about 60° C. A mineral oil having a composition of 0 to less than 5 percent aromatics, about 40 to about 80 percent paraffins and about 15 to about 60 percent naphtha, having a flash point above 60° C. produces good results. The amount of mineral oil used will normally be in excess of the amount of the monomers to be polymerized and while the proportion may vary from at least 1 weight percent of monomers and 99 weight percent mineral oil, up to about 50 weight percent monomers and 50 weight percent mineral oil, more normally a concentration of about 15 to 40 weight percent monomers is employed. More preferably, about 15 to 25 weight percent monomers is preferred. In the examples that follow the mineral oil had a room temperature viscosity of 90 cp, a density of 0.87 gm/cc and a dielectric constant at 1 kHz of 1.8.

Dispersions in organic media are inherently less stable than those in aqueous systems, thus requiring a stabilizer. The attractive interaction between these particles leads to their rapid coagulation unless a repulsive steric barrier is established at the interface between particles. In preferred embodiments of the invention, polymeric stabilizers are used for this purpose. Various types of polymeric stabilizers may be employed including homopolymers, and copolymers including random copolymers and block and graft copolymers with one segment being soluble in the polymerization medium and the other segment having an affinity towards the dispersed phase polymer. Comonomeric surfactants that are soluble in the selected continuous phase for the polymerization can also be used. Selection of stabilizers depends upon the nature of the polymer being formed and the polymerization medium. Block copolymers are molecules in which two different types of homopolymer chains are joined end to end. While any number of homopolymer blocks can be joined together, typically only one block of each homopolymer are involved. In the case of a block copolymer stabilizer, one block forms an anchor group segment which is nominally insoluble in the fluid media and attaches to the particle surface. The other block is soluble in the fluid, will generally be very long and provides the steric stabilization barrier. Graft copolymers are somewhat different. A long polymeric backbone is formed by one of the homopolymers with side chains of the other homopolymer attached at intervals along its length to form a comb-like copolymer structure. In this case the polymer backbone would form the anchor for attaching the molecule to the particle and the side chains would be solvated by the fluid media. Typical stabilizing block or graft copolymers that can be used as stabilizers include: homopolymers such as poly(methyl methacrylate) (PMMA), poly(vinyl acetate) (PVA), poly(12 hydroxystearic acid) (PSA) or poly(lauryl methacrylate) (PLM). The following graft or block copolymers can be employed when the dispersion polymer is poly(methyl methacrylate) or polystyrene: PMMA/PSA, PVA/PSA, PMMA/PLM or styrene butadiene copolymer. When the dispersion polymer is poly(vinyl acetate), the stabilizing block or graft copolymer may be PVA/PSA or PMMA/PSA.

It has been well established that the particle size and particle size distribution of the polymeric particles produced by dispersion polymerization can be controlled by varying several factors such as monomer, initiator and stabilizer concentrations. Solvency of the polymerization medium and polymerization temperature also have a strong effect on the particle size and the particle size distribution of the resulting polymeric dispersions. It is also known that, for the polymers which are soluble in their own monomers, the unreacted monomer keeps the growing radicals in the solution for a much longer period compared to those monomers which do not act as a solvent for the resulting polymers. In such systems, monomer concentration is reported to be very important, not only for the particle size, but also for the stability of the resulting dispersions.

It has also been demonstrated in the present invention that the particle size obtained by this type of polymerization can be controlled from submicron to 10-15 microns in diameter. However, from a stability point of view, smaller size particles are more desirable. The rate of sedimentation of the dispersed phase particles can be calculated using Stokes' law which shows that the stability against sedimentation is directly dependent upon the square of the particle diameter and the density difference between the particles and the medium and inversely dependent upon the viscosity of the medium. The organic medium used for polymerization is usually not as dense as the dispersed phase polymer, and generally has a lower viscosity. Therefore, the particle size must be smaller to minimize sedimentation during storage.

The following procedure was followed (except when otherwise indicated) in measuring the response of ER fluids produced according to this invention. A Rheometrics System 4 Rheometer was modified to facilitate the application of an applied electric field and was found to be a quick and reliable way of measuring the response of ER fluids. Accordingly, the fluid option assembly (cup and bob) of the Rheometer was modified to facilitate the application of a DC potential across a 2 mm gap between the cup and bob. The test sample was held between two coaxial cylinders (the cup and bob) having a total surface area of 82.9 cm. The bob has a radius of 24 mm and is 55 mm in length and is attached to the sensitive transducer which can measure a maximum torque of 100 gm-cm. The cup has an inner radius of 26 mm allowing the 2 mm gap. It is held by a motor that can perform both rotational and oscillatory motions. The electric potential is introduced into the bob by way of a brush device. The torque measurement is not attenuated by the incorporation of the voltage device. An insulator is placed between the transducer shaft and the electrified bob to shield the transducer electronics from the high voltage. The motor shaft and the cup are grounded. A Fluke voltage generator is used as the high voltage source capable of generating a voltage generator is used as the high voltage source capable of generating a maximum voltage of 10,000 V, DC. Ammeters are used to detect the current. A shield is placed in front of the rheometer to screen high voltage from the operator during a normal run. A standard ER test is the voltage screen experiment. The ER fluid is subjected to oscillatory shear flow at 5 rad/sec and 15% strain initially for 5 minutes. Then a voltage is turned on while the fluid is being sheared. After 15 minutes, the voltage is turned off for another 5 minutes. This process is repeated up to a limit of 2000 V, with the voltage increased in each repetition. Also, it is specified that experiments be discontinued if a maximum of 2500 micro Amps is drawn by the fluid. In the tables included herein Electric Field is expressed in units of kiloVolts per millimeter (kV/mm). The changes in the complex viscosity, storage modulus $G'$ and the loss modulus $G''$ were recorded, for the electric fields of varying strength. In the tables for the examples, the viscosity is expressed in units of poise. Generally, the magnitude of the ER effect increased with increasing field strength.

The ER experiments can be done at different temperatures. Below room temperature, a temperature control bath is used with isopropyl alcohol coolant. An external thermocouple probe immersed as close to the cup as possible is used to monitor the ER fluid temperature. For high temperatures, a Haake bath with silicone oil is used.

Changes in complex viscosity were studied as a function of applied field strength. As expected, the magnitude of the ER effect (change in the complex viscosity) increases with increasing field strength. The fluid behaves like a liquid in the unenergized state. With increased electric field strengths the ER fluid goes through a viscoelastic to an elastic solid-like material. Upon termination of the applied potential, the fluid resumes its original liquid behavior.

The first step in preparing the ER fluid is to synthesize the hydrophobic polymer particles e.g. polymethylmethacrylate (PMMA), or polystyrene (PS) by the dispersion polymerization method according to the procedure in Example 1. The hydrophobic polymeric particles produced according to Example 1 cannot be doped with water. However, these particles can be further processed to render their surface hydrophilic, which allows them to be doped with water, making the dispersion electrically active. For example, a dispersion of polymethylmethacrylate (PMMA) particles in mineral oil can be surface carboxylated by polymerizing acrylic acid at the particle surface. The resulting dispersions when doped with water show good ER response.

This novel method of making ER fluids not only resolves the stability problems but also results in a novel composition of the polymeric particles with added advantages. The bulk (about 85%) of each of the particles formed by this method consists of hydrophobic polymer. Only in interface regions is the hydrophilic polymer found. These polymers require a much lower amount of the water dopant than particles consisting of 100% hydrophilic polymer. As a result of this decreased demand for dopant, the current densities of these new fluids are much less than the fluids made by conventional methods. This concept is applicable not only to polymeric shells formed from acrylic acid monomer but also other hydrophilic monomers such as methacrylic acid, 2-sulfoethyl methacrylate and the others listed previously. The solubility of the hydrophilic monomer in the continuous phase and that of the hydrophobic polymer in the monomer being added and polymerized will determine the selection of such monomers. Those skilled in the art will be able to determine the appropriate hydrophylic monomer.

The process of hydrophilic modification of PMMA particles can be carried out in several ways. The seed particles can be crosslinked or non-crosslinked particles. The addition of monomer and the polymerization can be carried out under equilibrium conditions or under monomer starved conditions. Another necessary consideration is the compatibility of the resulting hydrophilic polymer with that of the seed hydrophobic polymer. In most of the experimental work conducted in connection with the instant invention, required amounts of acrylic acid containing initiator (benzoyl peroxide) and crosslinking agent were fed to the PMMA dispersion maintained in an inert atmosphere at the polymerization temperature (80° C.) over a one hour period. Other methods such as addition of all of the acrylic acid, initiator and crosslinking agent at once, or addition of monomer containing initiator and crosslinking agent at room temperature to the PMMA dispersion and allowing the monomer to equilibrate over a long period of time followed by polymerization also produced favorable results. When using crosslinked PMMA particles, the method of addition did not make much difference in the performance of the resulting fluids. However, with non-crosslinked particles results differed. Monomer starved conditions may be the only choice of monomer addition with the non-crosslinked particles.

EXAMPLE 1

DISPERSION POLYMERIZATION OF METHYLMETHACRYLATE

Dispersion polymerization of methylmethacrylate (MMA) in mineral oil was carried out using the ingredients shown in Table 1. This monomer is completely soluble in mineral oil and the resulting polymer is insoluble in this medium. In a typical experiment the stabilizer is first dissolved in mineral oil and charged to a jacketed glass reactor equipped with a stirrer, thermometer, condenser, and nitrogen sparging tube and heated to the polymerization temperature (80° C.) while sparging with nitrogen. In a separate beaker, initiator and crosslinking agent (if desired) are added, dissolved in the monomer and then charged to the reactor held at the polymerization temperature. The monomer is then allowed to polymerize for about 16 hours. Addition of cold monomer to the mineral oil mixture brings the temperature down to about 65° C. Once the temperature of the reaction mixture returns to 80° C. in about 5 minutes after addition of monomer, a strong exotherm occurs and the monomer polymerizes adiabatically for a short time with temperatures reaching as high as 140° C. for several minutes. The polymerization reaction is then continued for several hours at 80° C. The exothermic rise in temperature can also be controlled by a cooling liquid, if so desired. The conversion to polymer at the end of the exotherm is usually more than 95% and at the end of the run is usually greater than 99.5% The time for reaching the end product can be shortened by adding additional initiator at the end of the exotherm. The whole process can be completed within two hours.

The particle size of the dispersions prepared using the ingredients shown in Table 1 is usually in the range of about 0.5–0.8 micron, with a relatively narrow distribution of particle size.

TABLE 1

| Polymerization Recipe | | | Parts/100 |
|---|---|---|---|
| Mineral Oil | = | 261 gms (300 ml) | 55.3 |
| Stabilizer Acryloid 956* | = | 20 gms | 4.3 |
| Monomer Methylmethacrylate | = | 187 gms (200 ml) | 39.7 |
| Benzoyl Peroxide | = | 2.5 gms | 0.5 |
| TEGDMA** | = | 1.1 gms | 0.2 |
| Total | | 471.6 | 100.0 |

*Produced by Rohm and Haas
**Triethylene glycol dimethacrylate (crosslinking agent)

EXAMPLE 1A

The polymethyl methacrylate dispersions described in Example 1 were used as starting hydrophobic seed particles. These polymers were crosslinked using triethylene glycol dimethacrylate (TEGDMA) crosslinking agent. Acrylic acid (AA) was polymerized onto the hydrophobic polymeric particles. The desired amount of acrylic acid containing dissolved benzoyl peroxide initiator and crosslinking agent (if desired) was fed to the PMMA dispersion maintained in an inert atmosphere at the polymerization temperature of 80° C., over a one hour period. This process produced polymer particles having a PMMA core which was hydrophobic and a polyacrylic acid (PAA) shell or globule which was hydrophilic. A typical recipe is given in Table 1A.

Some PMMA-PAA fluids which had been exposed to an applied field did not return to the same zerofield viscosity on termination of the field. However, higher shear rates or longer waiting period did help in bringing the viscosities back to the original zerofield viscosity.

TABLE 1A

| PMMA dispersion of Example 1 | 250 grams |
|---|---|
| Mineral oil | 250 grams |
| Acrylic acid | 15.75 grams (15 ml) |
| Benzoyl peroxide | 0.30 grams |
| TEGDMA | 0.10 grams |
| Total | 516.15 grams |

EXAMPLES 2–6

Tables 2 through 6 show the electrorheological performance of polymethyl methacrylate core/polyacrylic acid shell or globule electrorheological fluids. In Tables 2 and 3, the PMMA particles are made with triethylene glycol dimethacrylate (TEGDMA) as the crosslinking agent, while in Table 4 the PMMA had divinylbenzene (DVB) as the crosslinking agent. No crosslinking agent was used for making the PMMA particles for the ER fluids shown in Table 6.

TABLE 2

Performance of PMMA-PAA Based ER Fluids
Effect of The Amount of PAA

| | Fluid Composition % | | | | Field Strength KV/mm Viscosity (Poise) | | | | |
|---|---|---|---|---|---|---|---|---|---|
| Example No. | PMMA$^{(a)}$ | PAA | H$_2$O | Rest | 0 | 0.25 | 0.50 | 0.75 | 1.00 |
| 2A | 19.7 | 0.4$^{(b)}$ | 1.0 | 78.9 | 1.8 | 1.8 | 1.8 | — | — |
| 2B | 19.4 | 2.1$^{(b)}$ | 1.0 | 77.5 | 2 | 15 | 87 | — | — |
| 2C | 19.2 | 3.1$^{(b)}$ | 1.0 | 76.7 | 2.9 | 83 | 234 | 328 | 345 |
| 2D | 19.7 | 0.4$^{(c)}$ | 1.0 | 78.9 | 1.8 | 1.8 | 1.8 | — | — |
| 2E | 19.4 | 2.1$^{(c)}$ | 1.0 | 77.5 | 2.3 | 19.3 | 122 | 197 | — |
| 2F | 19.2 | 3.1$^{(c)}$ | 1.0 | 76.7 | 2.8 | 81 | 234 | 252 | — |

$^{(a)}$PMMA crosslinked with TEGDMA.
$^{(b)}$non-crosslinking PAA.
$^{(c)}$PAA crosslinked with TEGDMA.

TABLE 3

Performance of PMMA-PAA Based ER Fluids
Effect of Dopant (H$_2$O)

| | Fluid Composition % | | | | Field Strength KV/mm Viscosity (Poise) | | | | |
|---|---|---|---|---|---|---|---|---|---|
| Example No. | PMMA$^{(a)}$ | PAA | H$_2$O | Rest | 0 | 0.25 | 0.50 | 0.75 | 1.0 |
| 3A | 19.9 | 0.4$^{(b)}$ | 0.25 | 79.45 | 1.8 | 1.8 | 1.8 | — | — |
| 3B | 19.7 | 0.4$^{(b)}$ | 1.00 | 78.9 | 1.9 | 1.8 | 1.8 | — | — |
| 3C | 19.9 | 0.4$^{(c)}$ | 0.25 | 79.45 | 1.8 | 1.8 | 1.8 | — | — |
| 3D | 19.7 | 0.4$^{(c)}$ | 1.00 | 78.9 | 1.8 | 1.8 | 1.8 | — | — |
| 3E | 19.5 | 2.1$^{(b)}$ | 0.7 | 77.7 | 2.2 | 41 | 162 | — | — |
| 3F | 19.4 | 2.1$^{(b)}$ | 1.0 | 77.5 | 2.0 | 15 | 87 | — | — |
| 3G | 19.5 | 2.1$^{(c)}$ | 0.7 | 76.9 | 2.6 | 23 | 44 | 325 | 463 |
| 3H | 19.4 | 2.1$^{(c)}$ | 1.0 | 77.5 | 2.3 | 19 | 122 | 197 | — |
| 3I | 19.3 | 3.1$^{(b)}$ | 0.7 | 76.9 | 2.9 | 78 | 244 | 415 | 523 |
| 3J | 19.2 | 3.1$^{(b)}$ | 1.0 | 76.7 | 2.9 | 82 | 234 | 326 | 345 |
| 3K | 19.3 | 3.1$^{(c)}$ | 0.7 | 76.9 | 2.8 | 83 | 247 | 417 | 510 |

TABLE 3-continued

Performance of PMMA-PAA Based ER Fluids
Effect of Dopant (H$_2$O)

| | Fluid Composition % | | | | Field Strength KV/mm Viscosity (Poise) | | | | |
|---|---|---|---|---|---|---|---|---|---|
| Example No. | PMMA$^{(a)}$ | PAA | H$_2$O | Rest | 0 | 0.25 | 0.50 | 0.75 | 1.0 |
| 3L | 19.2 | 3.1$^{(c)}$ | 1.0 | 76.7 | 2.8 | 81 | 234 | 256 | — |

$^{(a)}$PMMA crosslinked with TEGDMA.
$^{(b)}$non-crosslinked.
$^{(c)}$PAA crosslinked with TEGDMA.

TABLE 4

Performance of PMMA-PAA Based ER Fluids
Effect of Dopant (H$_2$O)

| | Fluid Composition % | | | | Field Strength KV/mm Viscosity (Poise) | | | | |
|---|---|---|---|---|---|---|---|---|---|
| Example No. | PMMA$^{(a)}$ | PAA | H$_2$O | Rest | 0 | 0.25 | 0.50 | 0.75 | 1.0 |
| 4A | 18.8 | 5.0 | 0.25 | 75.95 | 4.0 | 8.9 | 8.8 | 85 | 7.3 |
| 4B | 18.7 | 5.0 | 0.50 | 75.8 | 2.9 | 31 | 90 | 141 | 190 |
| 4C | 18.7 | 4.9 | 0.75 | 75.65 | 2.9 | 30 | 188 | 430 | 580 |
| 4D | 18.6 | 4.9 | 1.0 | 75.5 | 2.5 | 34 | 190 | (312–190) | |

| | | | | | 0.0 | 0.05 | 0.1 | 0.25 | 0.3 |
|---|---|---|---|---|---|---|---|---|---|
| 4E | 18.6 | 4.9 | 1.1 | 75.4 | 3.3 | 6.8 | 8.3 | — | — |
| 4F | 18.5 | 4.9 | 1.8 | 74.8 | 2.5 | — | — | 21 | 21 |
| 4G | 18.2 | 4.8 | 3.3 | 73.7 | 3.1 | 5.1 | 6.5 | — | — |

$^{(a)}$PMMA crosslinked with DVB.
$^{(b)}$non-crosslinking PAA.

TABLE 5

Performance of PMMA-PAA Fluids

| | Fluid Composition % | | | | Field Strength KV/mm Viscosity (Poise) | | | | |
|---|---|---|---|---|---|---|---|---|---|
| Example No. | PMMA$^{(a)}$ | PAA$^{(b)}$ | H$_2$O | Rest | 0 | 0.25 | 0.5 | 0.75 | 1.0 |
| 5A | 19.4 | 2.1 | 0.25 | 78.25 | 1.7 | 1.8 | 1.8 | — | — |
| 5B | 19.3 | 2.1 | 0.50 | 78.10 | 1.8 | 1.9 | 1.9 | — | — |
| 5C | 19.3 | 2.1 | 0.75 | 77.85 | 1.9 | 2.0 | 2.0 | — | — |
| 5D | 19.2 | 2.1 | 1.0 | 77.70 | 1.8 | 1.9 | 1.9 | — | — |

$^{(a)}$non crosslinked PMMA.
$^{(b)}$non crosslinked PAA.

Table 2 shows that an increased amount of polyacrylic acid, to form the hydrophilic shell or globule, increases the ER performance. It can also be seen in Table 2 that both crosslinked and uncrosslinked poly(acrylic acid) give good electrorheological performance. As expected, the ER response as measured by viscosity shows a steady increase as the field strength is increased.

The data shown in tables 3 and 4 demonstrate that there is an optimum dopant level for ER performance. Table 4 also shows that when DVB is used as the crosslinking monomer with PMMA, the results are similar to those when TEGDMA is the crosslinking agent. However, as seen in Table 5, field strengths which produce pronounced ER performance in the crosslinked PMMA, show no significant ER response at low PAA levels. This indicates that the surface hydrophilicity was not sufficient for these particles to be electrically active.

What I claim is:

1. An electrorheological fluid comprising in dispersion in a non-polar electrically insulating liquid, a polar liquid-containing solid phase, said solid phase consisting essentially of polymer particles, wherein said polymer particles have a hydrophobic polymer core and an unneutralized hydrophilic polymer shell around said core.

2. The electrorheological fluid of claim 1 wherein said hydrophobic polymer core is first polymerized in said electrically insulating liquid from hydrophobic monomer that is soluble in said liquid followed by addition of a hydrophilic monomer to said dispersion, said hydrophilic monomer polymerizing to form a hydrophilic polymer shell around said hydrophobic polymer core.

3. The electrorheological fluid of claim 2 further comprising a steric stabilizer polymer, wherein said steric stabilizer polymer is a homopolymer, or a copolymer selected from the group consisting of random copolymers, block copolymers and graft copolymers wherein a first segment of the copolymer is soluble in the electrically insulating liquid and a second segment of the copolymer has an affinity towards the dispersed phase polymer particles.

4. The electrorheological fluid of claim 3 wherein said steric stabilizer polymer is a homopolymer selected from the group consisting of poly(methyl methacrylate), poly(vinyl acetate), poly(12 hydroxystearic acid) and poly(lauryl methacrylate).

5. The electrorheological fluid of claim 2 wherein said electrically insulating liquid is a hydrophobic liquid selected from the group consisting of mineral oils, silicone oils, halogenated aromatic liquids and halogenated paraffins and mixtures thereof.

6. The electrorheological fluid of claim 1 wherein said polar liquid is water.

7. The electrorheological fluid of claim 2 wherein said hydrophobic monomer is selected from the group consisting of acrylates, methacrylates, styrenes, vinyl acetate, vinyl chlorides and acrylonitriles.

8. The electrorheological fluid of claim 7 wherein said hydrophobic monomer is selected from the group consisting of ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl acrylate, nonyl acrylate, hexyl acrylate, n-hexyl methacrylate, decyl acrylate, isodecyl methacrylate, lauryl acrylate, stearyl acrylate, behenyl acrylate, myristyl acrylate, styrene, alpha-methyl styrene, and vinyl toluene.

9. The electrorheological fluid of claim 8 wherein said hydrophobic monomer is methyl methacrylate.

10. The electrorheological fluid of claim 8 wherein said hydrophobic monomer is styrene.

11. The electrorheological fluid of claim 2 wherein said hydrophilic monomer is a carboxyl-containing or a sulfate or sulfonate-containing monomer wherein said carboxyl-containing monomer is selected from the group consisting of acrylic acid, methacrylic acid, itaconic acid, aconitic acid, fumaric acid, maleic acid and wherein said sulfonate-containing monomer is selected from the group consisting of 2-sulfoethyl acrylate, 2-sulfoethyl methacrylate, p-vinylbenzene sulfonate, vinylbenzyl sulfonate and vinyl sulfonate.

12. The electrorheological fluid of claim 1 wherein said polymer comprises particles that have a diameter in the range from about 0.1 micron to about 10 microns.

13. A method of preparing a fluid which exhibits electrorheological properties at low current densities comprising:
   admixing a solid phase into a non-polar electrically insulating liquid, said solid phase consisting essentially of polymer particles, wherein said polymer particles are first polymerized in said electrically insulating liquid from a hydrophobic monomer that is soluble in said liquid followed by addition of an unneutralized hydrophilic monomer to said dispersion, said unneutralized hydrophilic monomer polymerizing to form a unneutralized hydrophilic polymer shell around said polymer particles, followed by addition of a polar liquid.

14. The method of claim 13 further comprising addition of a steric stabilizer polymer wherein said steric stabilizer polymer is selected from the group consisting of homopolymers and random copolymers, block copolymers and graft copolymers wherein in said copolymers one segment of the copolymer is soluble in the electrically insulating liquid and a second segment of the copolymer has an affinity towards the dispersed phase polymer particles.

15. The method of claim 14 wherein said steric stabilizer polymer is a homopolymer selected from the group consisting of poly(methyl methacrylate), poly(vinyl acetate), poly(12 hydroxystearic acid) and poly(lauryl methacrylate).

16. The method of claim 13 wherein said electrically insulating liquid is a hydrophobic liquid selected from the group consisting of mineral oils, silicone oils, halogenated aromatic liquids and halogenated paraffins and mixtures thereof.

17. The method of claim 13 wherein said polar liquid is water.

18. The method claim 13 wherein said hydrophobic monomer is selected from the group consisting of acrylates, methacrylates, styrenes, vinyl acetate, vinyl chlorides and acrylonitriles.

19. The method of claim 18 wherein said hydrophobic monomer is selected from the group consisting of dimethyl acrylate, ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl acrylate, nonyl acrylate, hexyl acrylate, n-hexyl methacrylate, decyl acrylate, isodecyl methacrylate, lauryl acrylate, stearyl acrylate, behenyl acrylate, mryistyl acrylate, styrene, alpha-methylstyrene, and vinyl toluene.

20. The method of claim 19 wherein said hydrophobic monomer is methyl methacrylate.

21. The method of claim 19 wherein said hydrophobic monomer is styrene.

22. The method of claim 13 wherein said hydrophilic monomer is a carboxyl-containing or a sulfate or sulfonate-containing monomer wherein said carboxyl-containing monomer is selected from the group consisting of acrylic acid, methacrylic acid, itaconic acid, aconitic acid, fumaric acid, maleic acid and wherein said sulfonate-containing monomer is selected from the group consisting of 2-sulfoethyl acrylate, 2-sulfoethyl methacrylate, p-vinylbenzene sulfonate, vinylbenzyl sulfonate and vinyl sulfonate.

23. The method of claim 13 wherein said polymer comprises particles that are from about 0.1 micron in diameter to about 10 microns in diameter.

* * * * *

UNITED STATES PATENT AND TRADEMARK OFFICE
CERTIFICATE OF CORRECTION

PATENT NO. : 4,990,279
DATED : February 5, 1991
INVENTOR(S) : Syed M. Ahmed

It is certified that error appears in the above-identified patent and that said Letters Patent is hereby corrected as shown below:

Col. 4, line 37 of the printed patent, "mryistyl" should read -- myristyl --; and In the Claims, Col. 14, line 33, "mryistyl" should read -- myristyl --.

Signed and Sealed this

Thirtieth Day of June, 1992

Attest:

DOUGLAS B. COMER

*Attesting Officer*   Acting Commissioner of Patents and Trademarks